(12) United States Patent
Miyairi et al.

(10) Patent No.: US 7,648,683 B2
(45) Date of Patent: Jan. 19, 2010

(54) PLASMA GENERATING ELECTRODE, PLASMA GENERATOR, AND EXHAUST GAS PURIFYING DEVICE

(75) Inventors: Yukio Miyairi, Nagoya (JP); Yasumasa Fujioka, Nagoya (JP); Masaaki Masuda, Nagoya (JP); Tatsuhiko Hatano, Kasugai (JP); Takeshi Sakuma, Nagoya (JP); Yuuichiro Imanishi, Nagoya (JP); Keizo Iwama, Shioya-gun (JP); Kenji Dosaka, Shioya-gun (JP)

(73) Assignees: NGK Insulators, Ltd., Nagoya (JP); Honda Motor Co., Ltd., Tokyo (JP)

( * ) Notice: Subject to any disclaimer, the term of this patent is extended or adjusted under 35 U.S.C. 154(b) by 792 days.

(21) Appl. No.: 10/561,840

(22) PCT Filed: Jun. 25, 2004

(86) PCT No.: PCT/JP2004/009013

§ 371 (c)(1),
(2), (4) Date: Dec. 22, 2005

(87) PCT Pub. No.: WO2005/001249

PCT Pub. Date: Jan. 6, 2005

(65) Prior Publication Data

US 2006/0150911 A1   Jul. 13, 2006

(30) Foreign Application Priority Data

Jun. 27, 2003   (JP) .............................. 2003-185327

(51) Int. Cl.
*B01J 19/08*   (2006.01)
(52) U.S. Cl. .................... 422/186.04; 422/186; 204/164
(58) Field of Classification Search ............ 422/186.04, 422/186; 204/164
See application file for complete search history.

(56) References Cited

U.S. PATENT DOCUMENTS

2002/0131918 A1 * 9/2002 Nelson et al. .......... 422/186.04
2002/0134666 A1 * 9/2002 Hemingway et al. ........ 204/164

FOREIGN PATENT DOCUMENTS

| EP | 1 638 377 A1 | 3/2006 |
|---|---|---|
| JP | A 2001-164925 | 6/2001 |
| JP | 2001193441 A * | 7/2001 |
| JP | A-2001-193441 | 7/2001 |
| WO | WO 02074435 A1 * | 9/2002 |

OTHER PUBLICATIONS

Machine Translation of JP 2001-193441 A.*
U.S. Appl. No. 10/561,841, filed Dec. 22, 2005, Miyairi et al.
U.S. Appl. No. 10/562,597, filed Dec. 21, 2005, Miyairi et al.
U.S. Appl. No. 10/562,467, filed Dec. 27, 2005, Miyairi et al.
Supplementary European Search Report for European Application No. EP 04 74 6482 mailed Oct. 19, 2009.

* cited by examiner

*Primary Examiner*—Harry D Wilkins, III
*Assistant Examiner*—Bryan D. Ripa
(74) *Attorney, Agent, or Firm*—Oliff & Berridge, PLC

(57) ABSTRACT

A plasma generating electrode 1 of the present invention includes a plurality of unit electrodes 2 hierarchically layered at predetermined intervals, the unit electrodes 2 including a deficient unit electrode 2b in which a conductive film 4 has an absent portion and a normal unit electrode 2a in which the conductive film 4 does not have an absent portion. Spaces V formed between the unit electrodes 2 include a normal space Va formed so that the distance between conductive films 4 corresponds to the distance between the unit electrodes 2 and a deficient space Vb formed so that the distance between the conductive films 4 is greater than the distance between the conductive films 4 in the normal space Va. The plasma generating electrode 1 of the present invention can efficiently treat a plurality of predetermined components contained in a treatment target fluid by utilizing different types of plasma suitable for respective reactions by causing the treatment target fluid to flow only once.

13 Claims, 5 Drawing Sheets

PLASMA GENERATING ELECTRODE, PLASMA GENERATOR, AND EXHAUST GAS PURIFYING DEVICE

TECHNICAL FIELD

The present invention relates to a plasma generating electrode, a plasma reactor, and an exhaust gas purifying device. More particularly, the present invention relates to a plasma generating electrode and a plasma reactor capable of treating predetermined components contained in a treatment target fluid by utilizing different intensity of plasma suitable for respective reactions by causing the treatment target fluid to flow through a plasma generation space only once. The present invention also relates to an exhaust gas purifying device capable of purifying exhaust gas well.

BACKGROUND ART

It is known that silent discharge occurs when disposing a dielectric between two electrodes and applying a high alternating current voltage or a periodic pulsed voltage between the electrodes. In the resulting plasma field, active species, radicals, and ions are produced to promote reaction and decomposition of gas. This phenomenon may be utilized to remove toxic components contained in engine exhaust gas or incinerator exhaust gas.

For example, a plasma reactor which treats $NO_x$, carbon particulate, HC, and CO contained in engine exhaust gas or incinerator exhaust gas by causing the engine exhaust gas or incinerator exhaust gas to pass through a plasma field has been disclosed (e.g. JP-A-2001-164925).

DISCLOSURE OF THE INVENTION

However, since $NO_x$, carbon particulate, and the like differ in discharge voltage suitable for a plasma treatment, it is necessary to use different plasma reactors or generate plasma under the maximum discharge voltage conditions when treating such components contained in exhaust gas. Specifically, the equipment cost is increased when using different plasma reactors, and energy loss is increased when increasing the discharge voltage.

The present invention has been achieved in view of the above-described problem, and provides a plasma generating electrode and a plasma reactor capable of efficiently treating predetermined components contained in a treatment target fluid by utilizing different intensity of plasma suitable for respective reactions by causing the treatment target fluid to flow through a plasma generation space only once. The present invention also provides an exhaust gas purifying device which includes the above plasma reactor and a catalyst and can purify exhaust gas well.

In order to achieve the above objects, the present invention provides the following plasma generating electrode, plasma reactor, and exhaust gas purifying device.

[1] A plasma generating electrode comprising a plurality of unit electrodes hierarchically layered at predetermined intervals, spaces which are open on each end in one direction and are closed on each end in the other direction being formed between the unit electrodes, the plasma generating electrode being capable of generating plasma in the spaces upon application of voltage between the unit electrodes, each of the unit electrodes including a plate-like ceramic body as a dielectric and a conductive film disposed inside the ceramic body, the unit electrodes including a deficient unit electrode in which the conductive film is absent between one end and the other end in the one direction, and a normal unit electrode in which the conductive film is not absent, the spaces including a plurality of normal spaces formed between the normal unit electrode and the deficient unit electrode opposite to each other or between the deficient unit electrodes opposite to each other so that a distance between the conductive films corresponds to a distance between the unit electrodes, and a plurality of deficient spaces formed between the normal unit electrodes opposite to each other with a deficient portion of the deficient unit electrode interposed therebetween so that the distance between the conductive films in the deficient space is greater than the distance between the conductive films in the normal space, the plasma generating electrode being capable of generating different intensity of plasma in the normal space and the deficient space due to the difference in the distance between the conductive films forming the unit electrodes which generate plasma between the normal space and the deficient space.

[2] The plasma generating electrode according to [1], wherein the deficient unit electrode is formed by omitting only a part of the conductive film forming the unit electrode.

[3] The plasma generating electrode according to [1], wherein the deficient unit electrode is formed by omitting a part of each of the ceramic body and the conductive film forming the unit electrode.

[4] The plasma generating electrode according to any of [1] to [3], wherein the conductive film forming the unit electrodes is constituted of a plurality of conductive film groups set at different potentials upon application of voltage, the conductive film group (first conductive film group) set at a predetermined potential extending to an end of the space in the other direction, and the conductive film group (second conductive film group) set at a potential differing from the potential of the first conductive film group extending to an end of the space in the other direction, the conductive films (first side conductive film and second side conductive film) being provided on the end side face to which the first conductive film group extends and the end side face to which the second conductive film extends, the first conductive film group being in contact with the first side conductive film to achieve electrical conduction, and the second conductive film group being in contact with the second side conductive film to achieve electrical conduction.

[5] A plasma reactor comprising the plasma generating electrode according to any of [1] to [4], wherein, when gas containing predetermined components is introduced into the spaces formed between the unit electrodes forming the plasma generating electrode, the plasma reactor is capable of reacting the predetermined components contained in the gas by plasma generated in the spaces.

[6] The plasma reactor according to [5], wherein, when the gas containing the predetermined components is introduced into the spaces, a component of the predetermined components which is reacted by plasma generated in the normal space differs from a component of the predetermined components which is reacted by plasma generated in the deficient space.

[7] An exhaust gas purifying device comprising the plasma reactor according to [5] or [6] and a catalyst, the plasma reactor and the catalyst being disposed in an exhaust system of an internal combustion engine.

As described above, in a plasma generating electrode of the present invention, since the unit electrodes include the normal unit electrode and the deficient unit electrode so that the normal space and the deficient space both having the different distance between the conductive films are formed, intensity of plasma generated in the normal space and the deficient space can be made different. Since a plasma reactor of the present invention includes the plasma generating electrode, when gas containing predetermined components is introduced into the reactor, different kinds of components can be reacted by plasma generated in the normal space and plasma generated in the deficient space, so that each component can efficiently be reacted by optimum plasma. Since an exhaust gas purifying device of the present invention includes the above plasma reactor and a catalyst, the exhaust gas purifying device can purify exhaust gas well.

BRIEF DESCRIPTION OF THE DRAWINGS

FIG. 1(a) is a cross-sectional view schematically showing one embodiment of a plasma generating electrode of the present invention along a plane perpendicular to one direction.

FIG. 1(b) is a cross-sectional view along the line A-A' shown in FIG. 1(a).

FIG. 2 is a cross-sectional view of a unit electrode constituting a plasma generating electrode of the present invention.

FIG. 3 is a plan view schematically showing a conductive film constituting a plasma generating electrode of the present invention.

FIG. 4(a) is a cross-sectional view schematically showing another embodiment of a plasma generating electrode of the present invention along a plane perpendicular to one direction.

FIG. 4(b) is a cross-sectional view along the line B-B' shown in FIG. 4(a).

FIG. 5 is a side view showing a state that a side conductive film is disposed in another embodiment of a plasma generating electrode of the present invention viewed from the first end.

FIG. 6 is a perspective view schematically showing a protrusion-containing ceramic body constituting one embodiment of a plasma generating electrode of the present invention.

FIG. 7 is a perspective view schematically showing a conductive film-containing ceramic body forming one embodiment of a plasma generating electrode of the present invention.

FIG. 8 is a cross-sectional view schematically showing one embodiment of a plasma reactor of the present invention.

FIG. 9 is an explanatory view schematically showing one embodiment of an exhaust gas purifying device of the present invention.

BEST MODE FOR CARRYING OUT THE INVENTION

Embodiments of the plasma generating electrode, the plasma reactor, and the exhaust gas purifying device of the present invention are described below in detail with reference to the drawings. However, the present invention should not be construed as being limited to the following embodiments. Various changes, modifications, and improvements may be made within the scope of the present invention based on knowledge of a person skilled in the art.

Figure 1A:
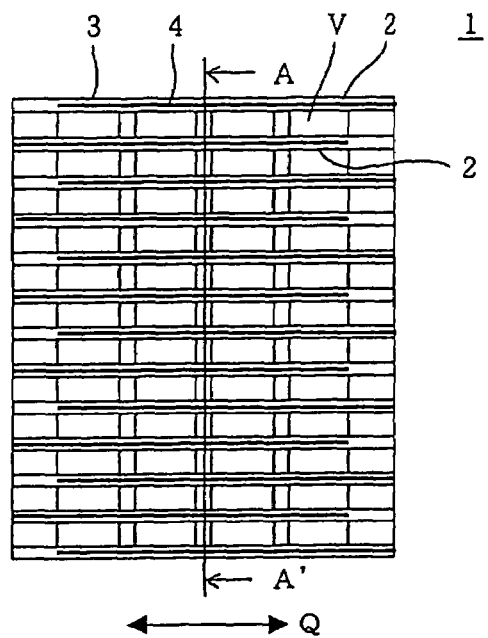
[FIG. 1(a)]
Figure 1B:
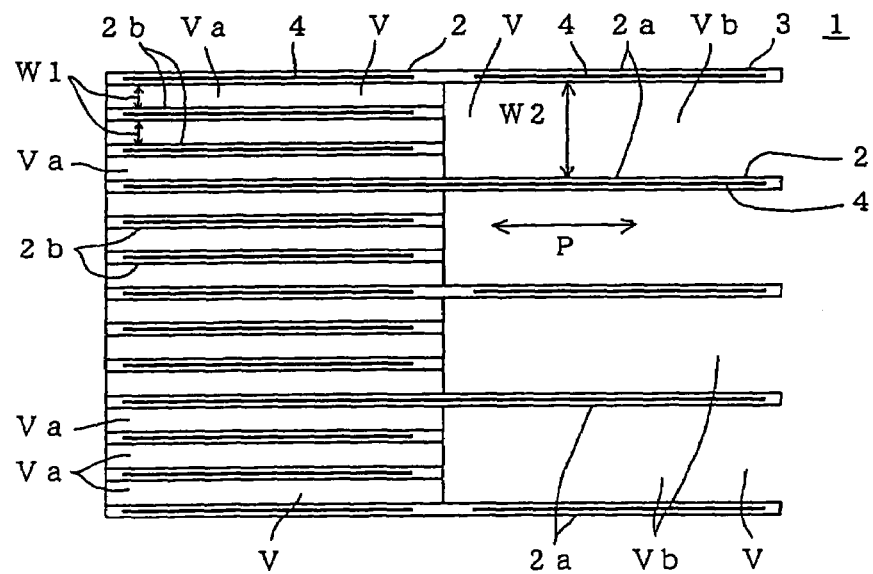
[FIG. 1(b)]
Figure 2:
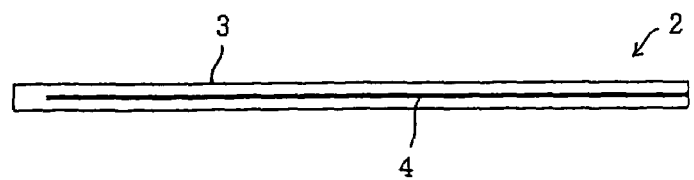
[FIG. 2]

FIGS. 1(a) and 1(b) shows one embodiment of a plasma generating electrode of the present invention. FIG. 1(a) is a cross-sectional view along a plane perpendicular to one direction, and FIG. 1(b) is a cross-sectional view along the line A-A' shown in FIG. 1(a). FIG. 2 is a cross-sectional view of a unit electrode constituting a plasma generating electrode of the present invention.

As shown in FIGS. 1(a) and 1(b), a plasma generating electrode 1 of the present one embodiment includes a plurality of unit electrodes 2 hierarchically layered at predetermined intervals, spaces V which are open on each end in one direction P and are closed on each end in the other direction Q being formed between the unit electrodes 2, the plasma generating electrode 1 being capable of generating plasma in the spaces V upon application of voltage between the unit electrodes 2.

As shown in FIG. 2, the unit electrode 2 constituting the plasma generating electrode 1 of the present embodiment includes a plate-like ceramic body 3 as a dielectric and a conductive film 4 disposed inside the ceramic body 3. As shown in FIGS. 1(a) and 1(b), the unit electrode 2 includes a deficient unit electrode 2b in which the conductive film 4 is absent between one end and the other end in the direction P, and a normal unit electrode 2a in which the conductive film 4 is not absent. The spaces V include a plurality of normal spaces Va formed between the normal unit electrode 2a and the deficient unit electrode 2b opposite to each other or between the deficient unit electrodes 2b opposite to each other so that the distance between the conductive films 4 corresponds to the distance between the unit electrodes 2, and a plurality of deficient spaces Vb formed between the normal unit electrodes 2a opposite to each other with a deficient portion of the deficient unit electrode 2b interposed therebetween so that the distance between the conductive films 4 in the deficient space Vb is greater than the distance between the conductive films 4 in the normal space Va.

The deficient portion refers to a portion in which the conductive film 4 of the unit electrode 2 is absent at a kind length from one end in the direction P. The fixed length is not particularly limited. It suffices that the fixed length allow the deficient space Vb to be formed so that a predetermined component can be reacted when the plasma generating electrode 1 is used for a plasma reactor described later. It is preferable that the deficient spaces Vb account for 20 to 80% of the total amount of the spaces V of the plasma reactor, for example. In the case of applying voltage, the unit electrodes 2 are alternately connected with a power source side and a grounding side. The normal unit electrode 2a and the deficient unit electrode 2b can be connected with either the power source side or the grounding side. Some or all of the normal unit electrodes 2a connected with the power source side may be divided (some of the normal unit electrodes 2a are divided in two in FIG. 1(b)) and set at different potentials. The divided normal unit electrodes 2a may be set at a single potential by using a single power source.

Since a plasma generating electrode 1 of the present embodiment is configured as described above, the distance between the conductive films 4 constituting the unit electrodes 2 which generate plasma differs between the normal space Va and the deficient space Vb, so that intensity of plasma generated in the normal space Va and the deficient space Vb differs. Therefore, when using the plasma generating electrode 1 of the present embodiment for a plasma reactor described later, predetermined components contained in a treatment target fluid can be treated by plasma at different intensity suitable for respective reactions by causing the treatment target fluid or the like to flow through the space where the plasma is generated only once.

The statement "plasma at different intensity" means that the amount of plasma energy differs. The amount of plasma energy is larger as the distance between the unit electrodes is smaller when the potential difference between the unit electrodes is the same.

In the deficient unit electrode 2b constituting the plasma generating electrode 1 of the present embodiment a part of each of the ceramic body 3 and the conductive film 4 forming the unit electrode 2 is absent from one end in the direction P. Therefore, the deficient portion of the deficient unit electrode 2b is a space (not only the conductive film 4 but also the ceramic body 3 does not exist), and the deficient space Vb is larger than the normal space Va between the normal unit electrodes 2a.

It is preferable that a distance W2 between the normal unit electrodes 2a (width of the deficient space Vb) be 0.5 to 5 mm. It is preferable that a distance W1 (width of the normal space Va) between the deficient unit electrodes 2b be 0.1 to 3 mm. In the present embodiment, one kind of deficient unit electrode 2b is used. However, two or more kinds of deficient unit electrodes 2b having different lengths may be used to form spaces having different widths. In this case, the third or subsequent space (not shown) is formed between the deficient unit electrodes or between the deficient unit electrode and the normal unit electrode. This allows plasma having further different intensity to be generated.

The thickness of the conductive film 4 forming the unit electrode 2 shown in FIGS. 1(a) and 1(b) is preferably 0.001 to 0.1 mm, and still more preferably 0.005 to 0.05 mm in order to reduce the size of the plasma generating electrode 1 and reduce the resistance of the treatment target fluid which is passed through the space between the unit electrodes 2 in the case of treating exhaust gas or the like.

The conductive film 4 used in the present embodiment preferably includes metal exhibiting excellent conductivity as the major component. As suitable examples of the major component of the conductive film 4, at least one kind of metal selected from the group consisting of tungsten, molybdenum, manganese, chromium, titanium, zirconium, nickel, iron, silver, copper, platinum, and palladium can be given. In the present embodiment, the term "major component" refers to a component accounting for 60 mass % or more of the components of the conductive film 4. When the conductive film 4 includes two or more metals selected from the above-mentioned group as the major component, the total amount of the metals accounts for 60 mass % or more of the components of the conductive film 4.

It is preferable that the conductive film 4 of the unit electrode 2 be applied to the tape-shaped ceramic body 3. As suitable examples of the application method, printing, rolling, spraying, electrostatic painting, dipping, knife coating, and the like can be given. According to these methods, a thin conductive film 4 exhibiting excellent surface flatness and smoothness after application can easily be formed.

When applying the conductive film 4 to the tape-shaped ceramic body, powder of the metal mentioned above as the major component of the conductive film 4, an organic binder, and a solvent such as terpineol may be mixed to form a conductive paste, and the conductive paste may be applied to the tape-shaped ceramic body 3 by using the above-mentioned method. An additive may optionally be added to the conductive paste in order to improve adhesion to the tape-shaped ceramic body 3 and improve sinterability.

The adhesion between the conductive film 4 and the ceramic body 3 can be improved by adding the same component as the component of the ceramic body 3 to the metal component of the conductive film 4. A glass component may be added to the ceramic component added to the metal component. The addition of the glass component improves sinterability of the conductive film 4 so that the density of the conductive film 3 is improved in addition to adhesion. The total amount of the component of the ceramic body 3 and/or the glass component other than the metal component is preferably 30 mass % or less. If the total amount exceeds 30 mass %, the function of the conductive film 4 may not obtained due to decrease in resistance.

The plate-like ceramic body 3 (tape-shaped ceramic body) constituting the unit electrode 2 has a function as a dielectric as described above. By using the conductive film 4 in a state that the conductive film 4 is disposed inside the ceramic body 3, local discharge such as a spark is reduced and small discharge can be caused at multiple locations in comparison with the case of causing discharge by using the conductive film 4 alone. Since such small discharge involves a small amount of current in comparison with discharge such as a spark, power consumption can be reduced. Moreover, current which flows between the unit electrodes 2 is limited due to the presence of the dielectric, so that nonthermal plasma which does not cause an increase in temperature and consumes only a small amount of energy can be generated.

Figure 3:
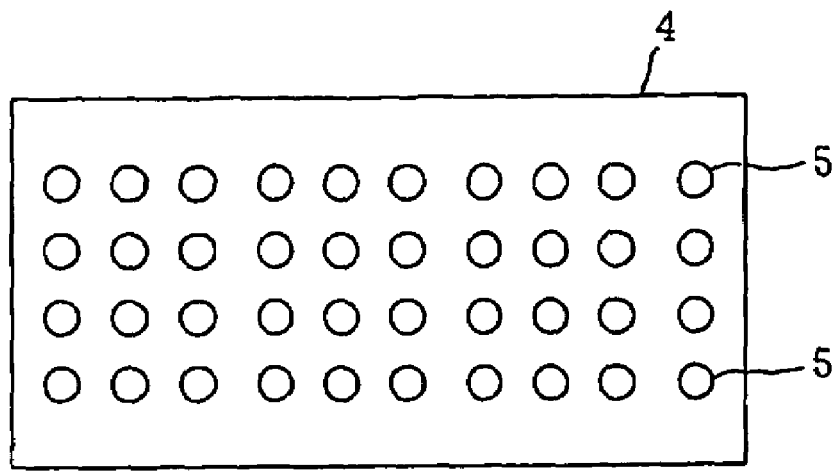
[FIG. 3]

It is preferable that at least one of the unit electrodes 2 include the plate-like ceramic body 2 as a dielectric and the conductive film 4 disposed inside the ceramic body 2 and having a plurality of through-holes 5, as shown in FIG. 3, formed through the conductive film 4 in its thickness direction and having a cross-sectional shape including an arc shape along a plane perpendicular to the thickness direction. In FIG. 3, the through-holes 5 are disposed so that each through-hole 5 is positioned at the vertex of a square. It is preferable that the through-holes 5 be disposed so that each through-hole 5 is positioned at the vertex of an equilateral triangle. Thus, more uniform discharge can be obtained by at low voltage by forming the through-holes 5 in the conductive film 4.

The size of the through-hole 5 is not particularly limited. For example, it is preferable that the diameter of the through-hole 5 be 1 to 10 mm. This allows electric field concentration at the outer periphery of the through-hole 5 to be appropriate for discharge, so that discharge can be started well even if the voltage applied between a pair of unit electrodes 2 is not so high. If the diameter of the through-hole 5 is less than 1 mm, discharge occurring at the outer periphery of the through-hole 5 becomes similar to the above-described local point discharge due to the two small through-holes, so that nonuniform plasma may be generated. If the diameter of the through-hole 5 is more than 10 mm, since discharge hardly occurs inside the through-hole 5, density of plasma generated between the pair of unit electrodes 2 may be decreased.

In the present embodiment, it is preferable that the center-to-center distance between the adjacent through-holes 5 be appropriately determined according to the diameters of the through-holes 5 so that uniform plasma can be generated at high density. For example, it is preferable that the center-to-center distance between the adjacent through-holes 4 be 1.5 to 20 mm, although the center-to-center distance is not limited thereto.

It is preferable that the through-hole 5 be formed so that the length of the outer periphery of the through-hole 5 per unit area is increased. This constitution enables the length of the region in which a nonuniform electric field occurs, that is, the outer periphery acting as a plasma generation point, to be increased per unit area, so that much discharge per unit area is caused, whereby plasma can be generated at high density. A specific length of the outer periphery of the through-hole 5 per unit area ($mm/mm^2$) may appropriately be determined depending on intensity of plasma to be generated or the like. In the case of treating automotive exhaust gas, the length of the outer periphery of the through-hole 5 per unit area is preferably 0.05 to 1.7 mm/mm$^2$. If the length of the outer periphery of the through-hole 5 per unit area is less than 0.05 mm/mm$^2$, local discharge may occur so that it may become difficult to obtain a stable discharge space. If the length of the outer periphery of the through-hole 5 per unit area is greater than 1.7 mm/mm$^2$, the resistance of the conductive film 4 may be increased so that the discharge efficiency may be decreased.

In the present embodiment, it is preferable that the area of the conductive film 4 per unit area be 0.1 to 0.98 mm$^2$/mm$^2$. If the area of the conductive film 4 per unit area is less than 0.1 mm$^2$/mm$^2$, it may become difficult to cause discharge to occur in an amount necessary for purifying exhaust gas due to two small electrostatic capacitance of the dielectric electrode. If the area of the conductive film 4 per unit area is more than 0.98 mm$^2$/mm$^2$, it may be difficult to obtain a uniform discharge effect due to the through-holes, so that a local discharge may easily occur.

It is preferable that the through-hole 5 formed in the conductive film 4 shown in FIG. 3 do not overlap a spacer for forming the space V between the unit electrodes 2 when the through-hole 5 is formed in the plasma generating electrode 1 shown in FIG. 1(a). This can prevent occurrence of abnormal discharge.

The plate-like ceramic body 3 preferably includes material having a high dielectric constant as the major component. As the material for the plate-like ceramic body 3, aluminum oxide, zirconium oxide, silicon oxide, mullite, cordierite, titanium-barium type oxide, magnesium-calcium-titanium type oxide, barium-titanium-zinc type oxide, silicon nitride, aluminum nitride, or the like may suitably be used. The plasma generating electrode can be operated even at a high temperature by using material exhibiting excellent thermal shock resistance as the major component of the ceramic body 3.

For example, a copper metallization technology may be used for a lower-temperature co-fired substrate material (LTCC) in which a glass component is added to aluminum oxide ($Al_2O_3$). The use of the copper metallization technology enables formation of an electrode having a low resistance and high discharge efficiency, so that the size of the electrode can be reduced. This enables a design preventing thermal stress, whereby the low strength problem can be solved. In the case of forming an electrode by using a high-dielectric-constant material such as barium titanate, magnesium-calcium-titanium type oxide, or barium-titanium-zinc type oxide, the size of the electrode can be reduced due to high discharge efficiency. Therefore, a structural design which can reduce occurrence of thermal stress due to high thermal expansion can be made.

At the time of forming the plate-like ceramic body 3 using a tape-shaped ceramic body, thickness of the tape-shaped ceramic body is preferably 0.1 to 3 mm, although the thickness of the tape-shaped ceramic body is not particularly limited. If the thickness of the tape-shaped ceramic body is less than 0.1 mm, the adjacent unit electrodes 2 may not be electrically insulated. If the thickness of the tape-shaped ceramic body is more than 3 mm, reduction in size of an exhaust gas purifying system may be hindered. Moreover, the applied voltage must be increased due to increase in the electrode-to-electrode distance, whereby the efficiency may be decreased.

As the tape-shaped ceramic body, a ceramic green sheet used for a ceramic substrate may suitably be used. The ceramic green sheet may be obtained by forming slurry or paste for a green sheet to a predetermined thickness by using a known method such as a doctor blade method, a calender method, a printing method, or a reverse roll coating method.

The resulting ceramic green sheet may be subjected to cutting, grinding, punching, or communicating hole formation, or may be used as an integral laminate in which the green sheets are layered and bonded by thermocompression bonding or the like.

As the slurry or paste for producing a green sheet, a mixture prepared by mixing an appropriate binder, sintering agent, plasticizer, dispersant, organic solvent, and the like into a predetermined ceramic powder may suitably be used. As suitable examples of the ceramic powder, alumina, mullite, cordierite, zirconia, silica, silicon nitride, aluminum nitride, ceramic glass, and glass can be given. As suitable examples of the sintering agent, silicon oxide, magnesium oxide, calcium oxide, titanium oxide, and zirconium oxide can be given. The sintering agent is preferably added in an amount of 3 to 10 parts by mass for 100 parts by mass of the ceramic powder. As the plasticizer, dispersant, and organic solvent, those used for a conventionally known method may suitably be used.

The porosity of the plate-like ceramic body 3 is preferably 0.1 to 35%, and more preferably 0.1 to 10%. This allows plasma to be efficiently generated between the unit electrode 2 including the plate-like ceramic body 3, so that energy saving can be realized.

The plate-like ceramic body 3 forming the unit electrode 2 shown in FIG. 2 is formed by disposing the conductive film 4 on a surface of the tape-shaped ceramic body and disposing a tape-shaped ceramic body over the conductive film 4 so that the conductive film 4 is held between the two tape-shaped ceramic bodies.

Figure 4A:
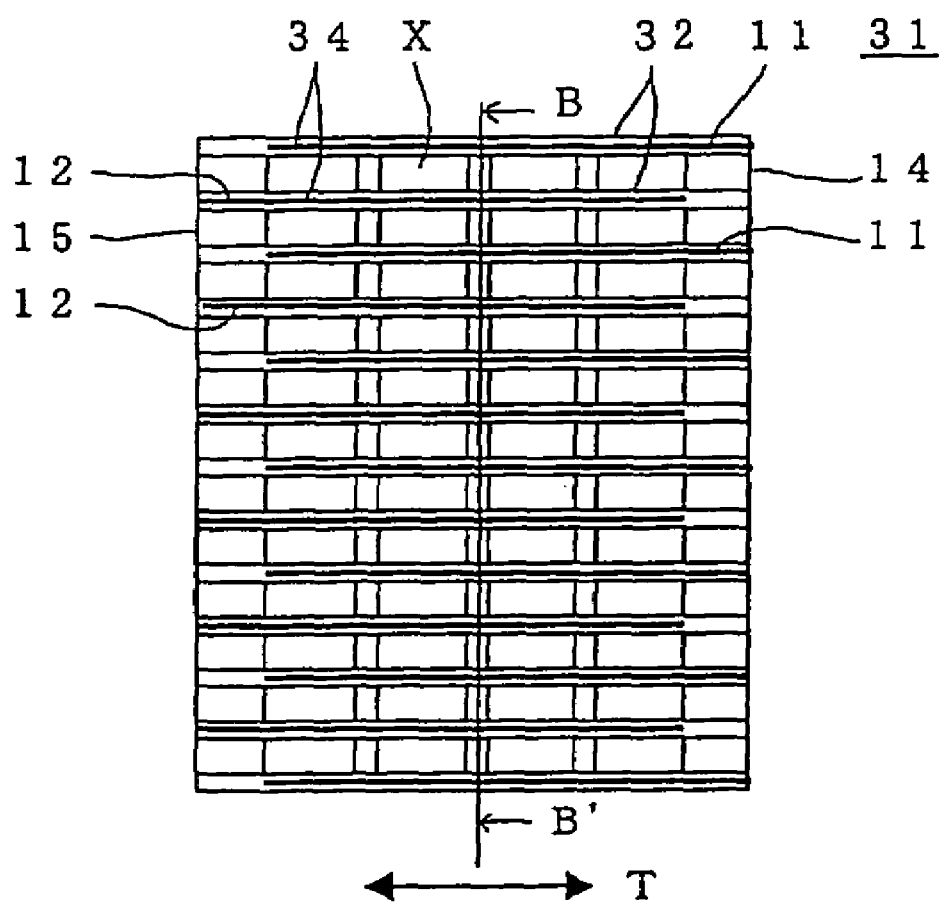
[FIG. 4(a)]
Figure 4B:
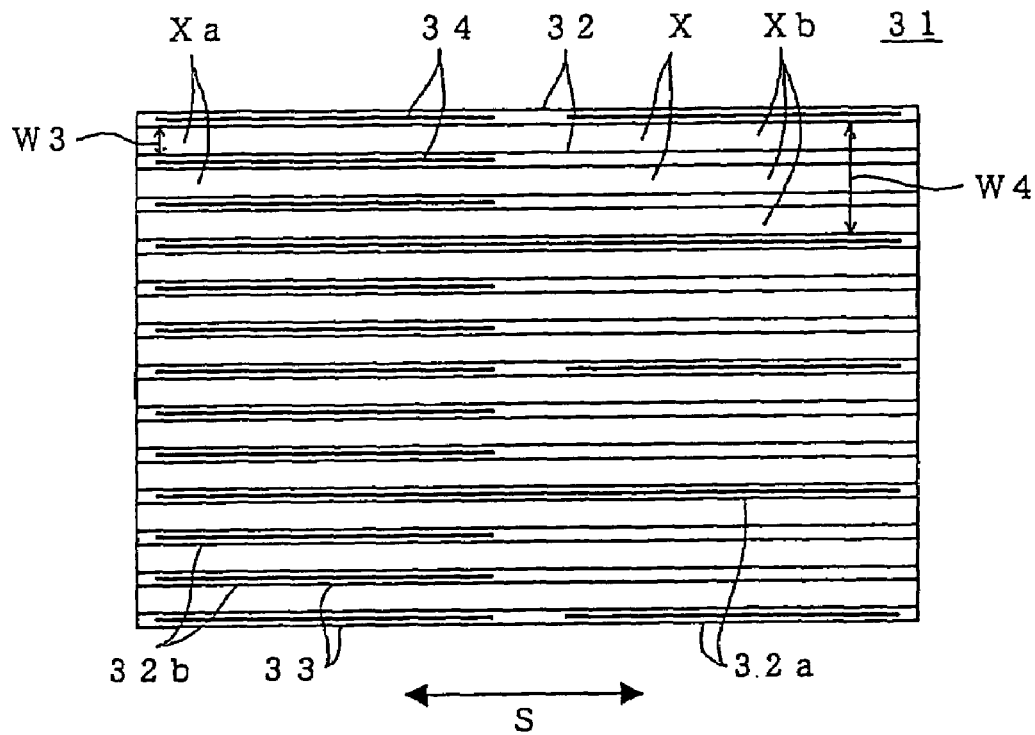
[FIG. 4(b)]

Another embodiment of the plasma generating electrode of the present invention is described below. FIGS. 4(a) and 4(b) are cross-sectional views schematically showing another embodiment of the plasma generating electrode of the present invention. FIG. 4(a) is a cross-sectional view along a plane perpendicular to one direction, and FIG. 4(b) is a cross-sectional view along the line B-B' shown in FIG. 4(a).

As shown in FIGS. 4(a) and 4(b), a plasma generating electrode 31 of the present embodiment includes a plurality of unit electrodes 32 hierarchically layered at predetermined intervals, a space X which is open on each end in one direction S and is closed on each end in the other direction T being formed between the unit electrodes 32, the plasma generating electrode 31 capable of generating plasma in the space X upon application of voltage between the unit electrodes 32, in the same manner as in the embodiment of the plasma generating electrode of the present invention shown in FIGS. 1(a) and 1(b). The plasma generating electrode 31 of one embodiment of the present invention differs from the embodiment of the plasma generating electrode of the present invention shown in FIGS. 1(a) and 1(b) in that a deficient electrode 32b constituting the plasma generating electrode 31 is formed by omitting a part of only a conductive film 34 constituing the unit electrode 32. Therefore, a plate-like ceramic body 33 exists in the deficient part of the deficient unit electrode 32b though the conductive film 34 does not exist. A deficient space Xb is constituted by a space between the normal unit electrode 32a and the deficient area of the deficient unit electrode 32b (area in which the plate-like ceramic body 33 exists) and a space between the deficient areas of the deficient unit electrodes 32b. Therefore, the deficient space Xb has the same width the same as the width of a normal space Xa, differing from the above-described embodiment of the plasma generating electrode of the present invention. The distance between the conductive films 34 of the unit electrode 32 which generate plasma in the normal space Xa is approximately the same as a distance W3 between the unit electrodes 32 forming the normal space Xa (The difference amounts for thickness of a tape-shaped ceramic body 33). The distance between the conductive films 34 of which generate plasma in the deficient space Xb is approximately the same as a distance W4 between the normal unit electrodes 32a opposite to each other with the deficient unit electrode 32b interposed therebetween since the conductive film 34 does not exist in the deficient unit electrode 32b forming the deficient space Xb. Thus, in the present embodiment, while the width of the normal space Xa is the same as the width of the deficient space Xb, the distance between the conductive films 34 which generate plasma in each space differs. Therefore, intensity of plasma generated in the deficient space Xb differs from the intensity of plasma generated in the normal space Xa.

A configuration other than that described above of the plasma generating electrode of the present embodiment may be the same as the configuration of the above-described embodiment of the plasma generating electrode of the present invention.

Figure 5:
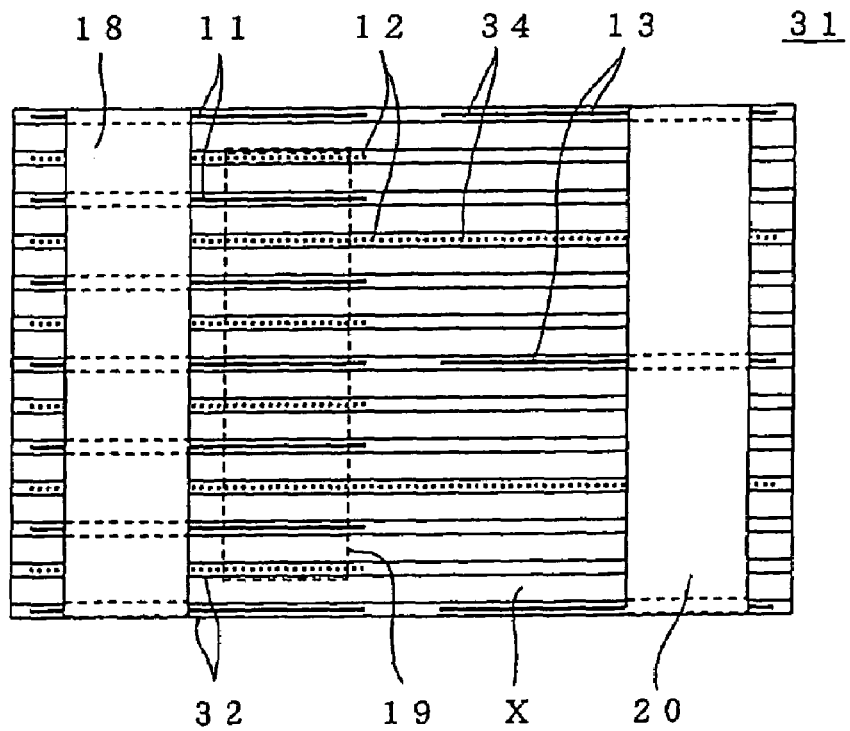
[FIG. 5]

In the above-described embodiment of the plasma generating electrode of the present invention, as shown in FIG. 5, it is preferable that the conductive film 34 constituting the unit electrode 32 include a plurality of conductive film groups set at different potentials when voltage is applied, that a conductive film group (first conductive film group) 11 set at a predetermined potential extend to an end (first side end) 14 (see FIG. 4(a)) of the space X in the other direction T (see FIG. 4(a)), and that a conductive film group (second conductive film group) 12 set at a potential differing from the potential of the first conductive film group 11 extend to an end (second side end) 15 (see FIG. 4(a)) of the space X in the other direction T (see FIG. 4(a)). FIG. 5 is a side view from the first side end showing a state that a side conductive film is disposed in the embodiment of the plasma generating electrode of the present invention shown in FIG. 4. It is preferable that the conductive films (first side conductive film 18 and second side conductive film 19) be provided on the surface on the end (first side end) 14 to which the first conductive film group 11 extends and the surface on the end to which the second conductive film group extends, the first conductive film group 11 be electrically connected with the first side conductive film 18, and the second conductive film group 12 be electrically connected with the second side conductive film 19. In the present embodiment, some of the unit electrodes 32 including the first conductive film group 11 are the normal unit electrodes 32a (see FIG. 4(b)), and the conductive film 34 (see FIG. 4(b)) of the normal unit electrode 32a (see FIG. 4(b)) is cut in its middle portion so that a third conductive film group 13 which is not electrically connected with the first conductive film group 11 is formed. The third side conductive film 20 which is in contact with the third conductive film group 13 to enable electrical conduction is formed on the first side end 14. The first conductive film group 11 and the second conductive film group 12 may respectively extend to an end on the same side of the space X in the direction T (see FIG. 4(a)). The first conductive film group 11 and the second conductive film group 12 may be electrically connected on an end at the same side through the first side end conductive film 18 and the second side end conductive film 19, respectively.

The side conductive film may also be used to electrically connect the conductive films 4 in the embodiment of the plasma generating electrode of the present invention shown in FIGS. 1(a) and 1(b).

A method of manufacturing the plasma generating electrode of one embodiment of the present invention is described below in detail.

First, a ceramic green sheet used for the above ceramic body is formed. For example, a sintering agent, a binder such as a butyral resin or a cellulose resin, a plasticizer such as DOP or DBP, an organic solvent such as toluene or butadiene, and the like are added to at least one kind of material selected from the group consisting of alumina, mullite, cordierite, mullite, silicon nitride, aluminum nitride, ceramic glass, and glass. The components are sufficiently mixed by using an alumina pot and an alumina ball to prepare slurry for a green sheet. The slurry for a green sheet slurry may be prepared by mixing the materials by ball milling using a mono ball.

The resulting slurry for a green sheet is stirred under reduced pressure for degassing and adjusted to have a predetermined viscosity. The slurry for a green sheet is formed in the shape of a tape by using a tape forming method such as a doctor blade method to form an unfired ceramic body.

Meanwhile, a conductive paste for forming a conductive film disposed on one surface of the unfired ceramic body is prepared. The conductive paste may be prepared by adding a binder and a solvent such as terpineol to silver powder and sufficiently kneading the mixture by using a tri roll mill, for example.

The resulting conductive paste is printed on a surface of the unfired ceramic body by screen printing or the like to form a conductive film having a predetermined shape to obtain a conductive film-containing unfired ceramic body. In order to supply electricity to the conductive film from the outside after forming a unit electrode by holding the conductive film between the ceramic bodies, the conductive paste is preferably printed to extend to the outer periphery of the unfired ceramic body.

As the unfired ceramic body, a long unfired ceramic body corresponding to the normal unit electrode and a short unfired ceramic body corresponding to the deficient unit electrode are formed. In the case of forming the conductive films of the normal unit electrodes which are not electrically connected, the conductive paste may be printed in a predetermined shape.

Another unfired ceramic formed body is layered on the unfired ceramic body on which the conductive films are printed so that the printed conductive films are covered. It is preferable to layer the unfired ceramic formed bodies at a temperature of 100° C. while applying a pressure of 10 MPa. Then, the unfired ceramic bodies layered in a state that the conductive film is held therebetween are fired to form a unit electrode including the plate-like ceramic body as a dielectric and the conductive film.

The resulting unit electrodes are then layered. At this time, in order to form a predetermined interval between the unit electrodes, a ceramic rod in the shape of a quadrilateral prism is formed by using a raw material similar to that of the above ceramic body and placed between the unit electrodes. The thickness of the ceramic rod corresponds to the distance between the unit electrodes. The ceramic rods are placed between the unit electrodes in parallel to secure gas passages upon treating exhaust gas or the like. The ceramic rod need not be in the shape of a quadrilateral prism, and may be in the shape of a cylinder, a polygonal prism, or another prism shape. A plurality of protrusions may be formed on one surface of the ceramic body, and spaces may be formed by disposing the unit electrodes with the protrusions interposed therebetween. Depressions and protrusions may be formed on the ceramic bodies, and spaces may be formed by piling up the ceramic bodies. As described above, the plasma generating electrode of the present embodiment may be obtained by hierarchically layering the unit electrodes through the above ceramic rods.

Figure 6:
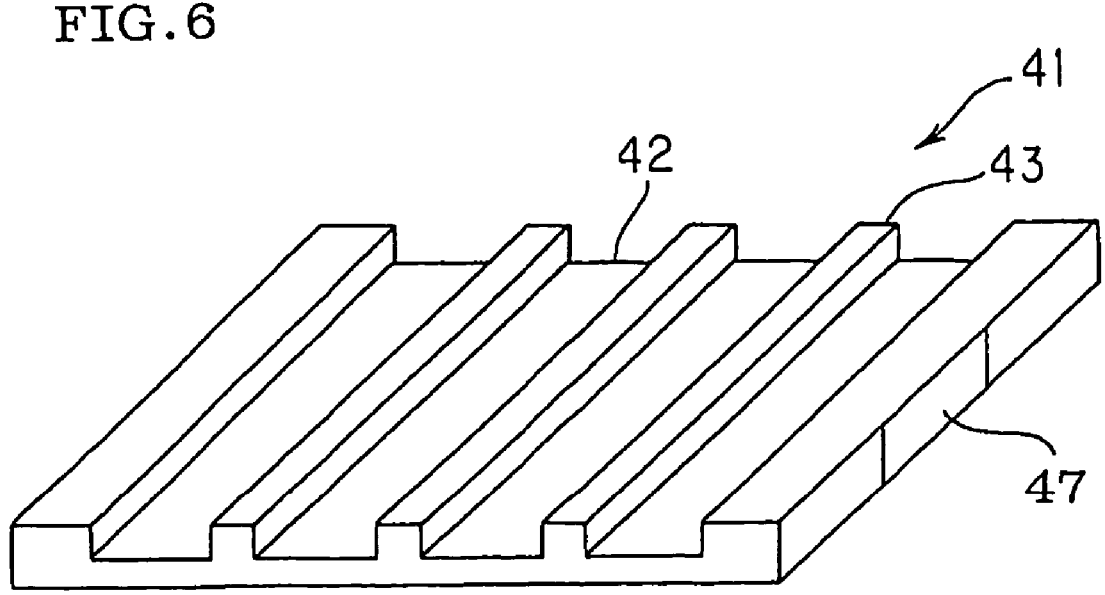
[FIG. 6]
Figure 7:
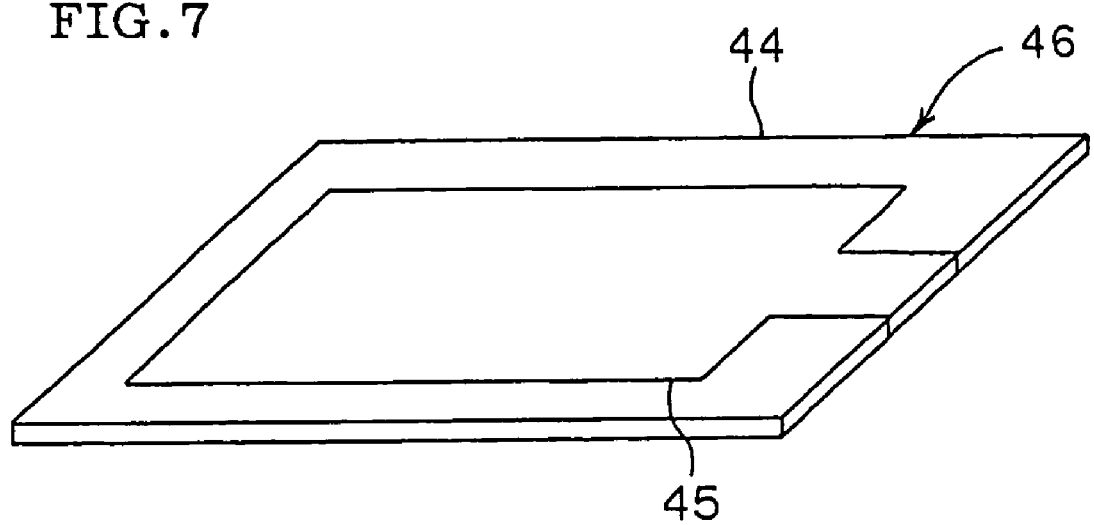
[FIG. 7]

The plasma generating electrode of the present embodiment may be manufactured by the following method. A protrusion-containing ceramic body 41 shown in FIG. 6, in which a plurality of protrusions 43 are provided almost in parallel on a plate-like ceramic body 42, is formed by extrusion, and an end face conductive film 47 is provided at the end face. A plate-like ceramic body 44 which forms a conductive film-containing ceramic body 46 shown in FIG. 7 is formed by extrusion. Conditions of the raw materials for the protrusion-containing ceramic body 41 and the plate-like ceramic body 44 and the like are preferably the same as those of the above method of manufacturing the plasma generating electrode of the present embodiment.

Next, as shown in FIG. 7, a conductive film 45 is provided in the plate-like ceramic body 44. The material for the conductive film 45, the method of providing the conductive film 45 in the ceramic body 44, and the like are preferably the same as in the case of the above method of manufacturing the plasma generating electrode of the present embodiment.

The conductive film-containing ceramic body 46 is disposed on the protrusion-containing ceramic body 41 on the side on which the protrusions 43 are not formed so that the conductive film 45 is in contact with the protrusion-containing ceramic body 41 on the side on which the conductive film 45 is formed to form a laminate. The predetermined number of laminates are layered to form an unfired plasma generating electrode. Then, the unfired plasma generating electrode is fired to obtain a plasma generating electrode of the present embodiment.

Figure 8:
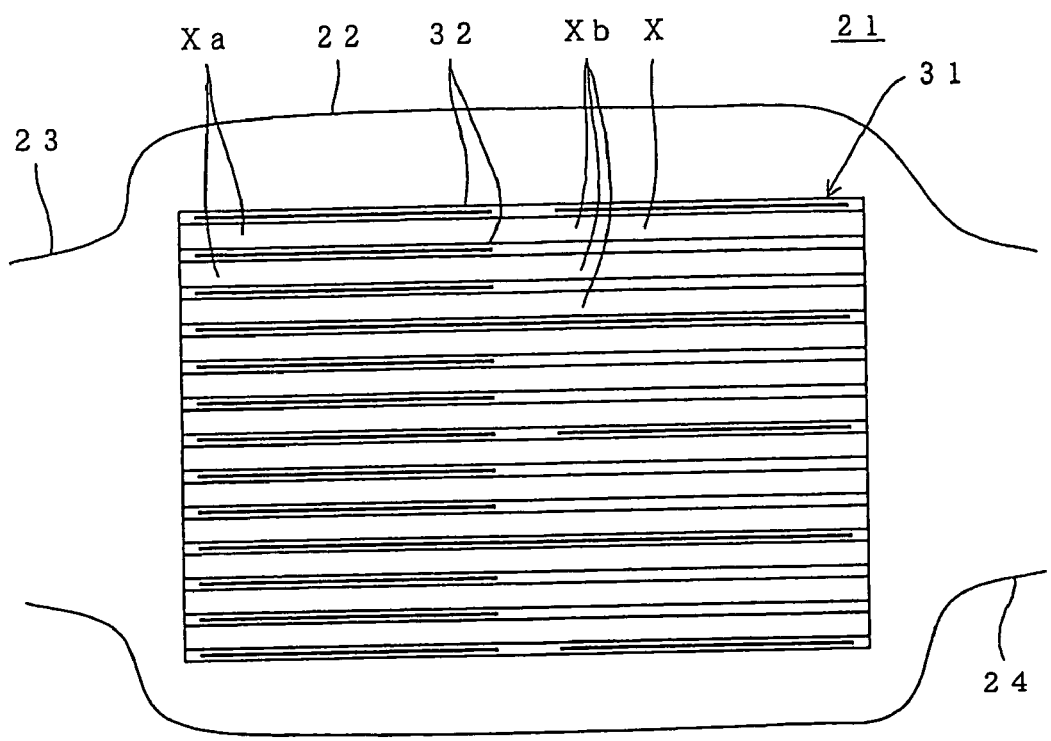
[FIG. 8]

One embodiment of a plasma reactor of the present invention is described below. FIG. 8 is a cross-sectional view schematically showing one embodiment of a plasma reactor of the present invention. As shown in FIG. 8, a plasma reactor 21 of the present embodiment includes another embodiment of the plasma generating electrode (plasma generating electrode 31) of the present invention shown in FIG. 4. Specifically, the plasma reactor 21 of the present embodiment includes the plasma generating electrode 31, and a casing 22 in which the plasma generating electrode 31 is placed in such a state that gas (treatment target fluid) containing predetermined components can be introduced into the space X three-dimensionally arranged between the unit electrodes 32. The casing 22 includes an inlet port 23 through which the treatment target fluid flows into the plasma reactor 21, and an outlet port 24 through which the treatment target fluid which has passed through the space between the unit electrodes 32 and has been treated (treated fluid) is discharged. The plasma reactor 21 of the present embodiment configured as described above allows, when gas containing predetermined components is introduced into the space X, the predetermined components in the gas to be reacted by plasma generated in the space X.

Since the plasma reactor 21 of the present embodiment includes the plasma generating electrode 31 shown in FIG. 4, when the treatment target fluid flows into the plasma reactor 21 through the inlet port 23 and passes through the normal space Xa, a substance (e.g. particulate) which requires plasma having a large amount of energy for its reaction is decomposed by plasma generated by the conductive films 34 arranged at a small interval. When the treatment target fluid passes through the deficient space Xb, a substance (e.g. $NO_x$) which is reacted by plasma having a small amount of energy is decomposed by plasma generated by the conductive films 34 arranged at large intervals. As described above, the plasma reactor of the present embodiment can efficiently treat predetermined components contained in the treatment target fluid by utilizing different intensity of plasma suitable for respective reactions by causing the treatment target fluid to flow through the plasma generation space only once.

In the plasma reactor 21 of the present embodiment, it is preferable to provide a buffer material having insulating properties and heat resistance between the casing 22 and the plasma generating electrode 31 at the time of disposing the plasma generating electrode 31 in order to prevent breakage.

The material for the casing 22 used in the present embodiment is not particularly limited. For example, it is preferable to use ferritic stainless steel having excellent conductivity, being lightweight and inexpensive, and showing only a small amount of deformation due to thermal expansion as the material for the casing 22.

The plasma reactor 21 configured as described above may be installed in an automotive exhaust system, for example. In this case, exhaust gas is passed through plasma generated in the space X formed between the unit electrodes 32 so that toxic substances such as soot and nitrogen oxide (the above predetermined components) contained in the exhaust gas are reacted and discharged to the outside as nonhazardous gas.

The plasma reactor of the present embodiment may include a power source (not shown) for applying voltage to the plasma generating electrode. As the power source, a conventionally known power source which can supply electricity so that plasma can effectively be generated may be used.

The plasma reactor of the present embodiment may be configured so that current is supplied from an external power source instead of providing a power source in the plasma reactor.

Current supplied to the plasma generating electrode used in the present embodiment may appropriately be selected depending on intensity of plasma to be generated. In the case of installing the plasma reactor in an automotive exhaust system, it is preferable that current supplied to the plasma generating electrode be a direct current at a voltage of 1 kV or more, a pulsed current having a peak voltage of 1 kV or more and a pulse rate per second of 100 or more (100 Hz or more), an alternating current having a peak voltage of 1 kV or more and a frequency of 100 Hz or more, or a current generated by superimposing one on another among these currents. This enables efficient generation of plasma.

Figure 9:
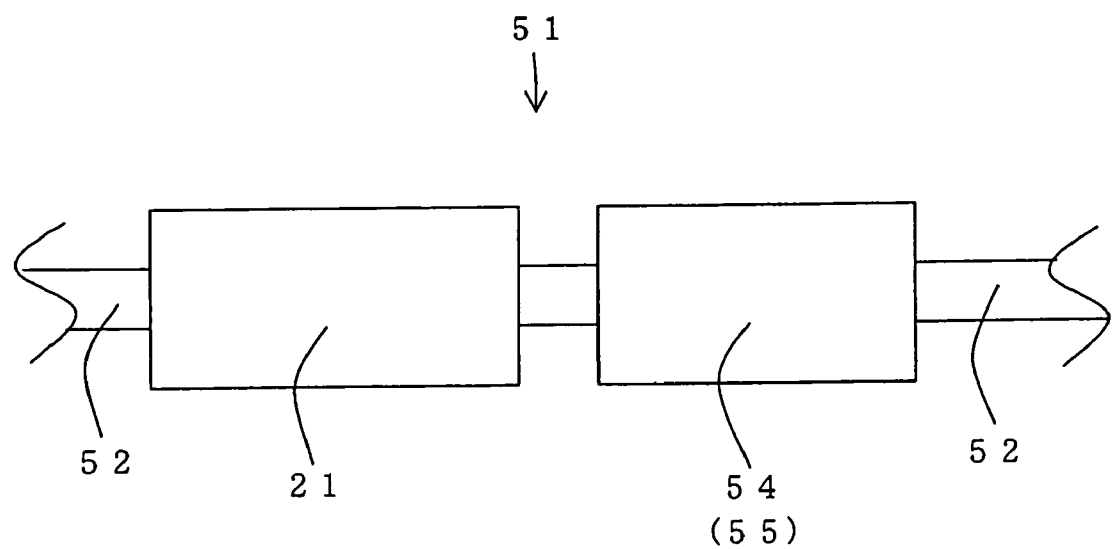
[FIG. 9]

One embodiment of an exhaust gas purifying device of the present invention is described below in detail. FIG. 9 is an explanatory view schematically showing an exhaust gas purifying device of the present embodiment. As shown in FIG. 9, an exhaust gas purifying device 51 of the present embodiment includes the plasma reactor 21 of the above-described embodiment of the second invention and a catalyst 54, the plasma reactor 21 and the catalyst 54 being provided inside an exhaust system of an internal combustion engine. The plasma reactor 21 is provided on the exhaust gas generation side (upstream) of the exhaust system, and the catalyst 54 is provided on the exhaust side (downstream). The plasma reactor 21 and the catalyst 54 are connected through a pipe 52.

The exhaust gas purifying device 51 of the present embodiment is a device which purifies $NO_x$ contained in exhaust gas in an oxygen-excess atmosphere, for example. That is, $NO_x$ is reformed by plasma generated by the plasma reactor 21 so that $NO_x$ is easily purified by the downstream catalyst 54, or a hydrocarbon (HC) or the like in the exhaust gas is reformed so that the HC easily reacts with $NO_x$, and $NO_x$ is purified by the catalyst 54.

The plasma reactor 21 used for the exhaust gas purifying device 51 of the present embodiment converts $NO_x$ contained in exhaust gas generated by combustion in an oxygen-excess atmosphere, such as in a lean burn or gasoline direct injection engine or a diesel engine, into $NO_2$. The plasma reactor 21 generates active species from the HC or the like contained in exhaust gas. As the plasma reactor 21, a plasma reactor configured in the same manner as the plasma reactor 21 shown in FIG. 8 may suitably be used.

The catalyst 54 is provided downstream of the plasma reactor 21 in the exhaust system as a catalyst unit 55 provided with a catalytic member including a substrate having pores through which exhaust gas is circulated. The catalytic member includes the substrate and a catalyst layer formed to cover the inner wall surfaces surrounding the pores of the substrate.

Since the catalyst layer is generally formed by impregnating the substrate with a catalyst in a slurry form (catalyst slurry) as described later, the catalyst layer may be called a "washcoat (layer)".

The shape of the substrate is not particularly limited insofar as the substrate has an exhaust gas circulation space. In the present embodiment, a honeycomb-shaped substrate having pores is used.

It is preferable that the substrate be formed of a material exhibiting heat resistance. As examples of such a material, a porous material (ceramic) such as cordierite, mullite, silicon carbide (SiC), and silicon nitride ($Si_3N_4$), a metal (e.g. stainless steel), and the like can be given.

The catalyst layer is mainly formed by a porous carrier and one or a combination of two or more elements selected from Pt, Pd, Rh, Au, Ag, Cu, Fe, Ni, Ir, and Ga supported on the surface of the porous carrier. Pores continuous with the pores in the substrate are formed in the catalyst layer.

The porous carrier may appropriately be formed of a material selected from alumina, zeolite, silica, titania, zirconia, silica-alumina, ceria, and the like. As the catalyst 54, a catalyst which promotes decomposition of $NO_x$ is used.

The present invention is described below in detail by way of examples. However, the present invention should not be construed as being limited to the following examples.

Example 1

A plasma generating electrode 1 having a configuration as shown in FIG. 1 was formed, and exhaust gas was treated by using the plasma generation electrode 1. The amounts of soot, nitrogen monoxide (NO), and hydrocarbon (HC) contained in the gas after treatment were measured, and the presence or absence of aldehyde was determined.

A plasma generating electrode used in the plasma reactor of this example was formed as follows. A conductive film in which through-holes were formed in such an arrangement pattern that the diameter of the through-holes was 5 mm and the interval between the adjacent through-holes was 6 mm was screen-printed to have a thickness of 10 μm on inside unfired alumina tape substrate having a thickness of 0.5 mm after firing with layering two substrates by using a tungsten paste. An electrode A having an 80×40 mm conductive film on the gas inlet side (normal space Va (see FIG. 1(b))) and an 80×40 mm conductive film on the gas outlet side (deficient space Vb (see FIG. 1(b))) on a 100×100 mm substrate, an electrode B having an 80×90 mm conductive film on a 100×100 mm substrate, and electrodes C and D having an 80×40 mm conductive film on a 100×50 mm substrate and having terminals at different end faces were layered in the order of A, C, D, B, C, and D at electrode intervals of 0.5 mm to produce an integral electrode unit. Two six-stage integral electrode units were fired by using a metal frame, held at the outer circumference by using a thermoresistant mat, and placed in a cylindrical container made of SUS430. The inlet side of the electrode A and the outlet side of the electrode D and the electrode A were connected with a pulse power source, and the electrodes B and C were connected with the grounding side. The electrode-to-electrode distances between the inlet side of the electrode A (inlet side electrode) and the electrode C and between the electrode D and the electrode B were respectively 0.5 mm, and the electrode-to-electrode distance between the outlet side of the electrode A (outlet side electrode) and the electrode B was 2.5 mm.

Exhaust gas simulating exhaust gas discharged from an engine was passed through the plasma reactor. As the exhaust gas, a gas prepared by mixing 1000 mg/hr of soot into a mixed gas containing 10 vol % of oxygen, 10 vol % of $CO_2$, 200 ppmC of propylene, and 200 ppm of NO gas, with the balance being nitrogen, was used. The concentration of each component (PM amount) contained in the gas after being passed through plasma was measured. The measurement results are shown in Table 1.

TABLE 1

|  | Example 1 | Example 2 | Example 3 | Comparative Example 1 | Comparative Example 2 |
| --- | --- | --- | --- | --- | --- |
| Inlet side electrode voltage (kV) | 5 | 4 | 4 | 4 | 0 |
| Number of pulses (pulse/sec) | 500 | 500 | 100 | 100 | — |
| Outlet side electrode voltage (kV) | 5 | 6 | 6 | 0 | 6 |
| Number of pulses (pulse/sec) | 500 | 500 | 1000 | — | 1000 |
| Amount of NO (ppm) | 70 | 50 | 60 | 120 | 50 |
| Amount of HC (ppmC) | 80 | 60 | 70 | 90 | 100 |
| Aldehyde | Present | Present | Present | Present | Present |
| Amount of PM (mg/hr) | 60 | 70 | 40 | 40 | 950 |

Example 2

A pulsed current was applied to a plasma reactor configured in the same manner as the plasma reactor of Example 1 by applying a voltage of 4 kV to the inlet side electrode and applying a voltage of 6 kV to the outlet side electrode, and the measurement was conducted as described above. The measurement results are shown in Table 1.

Example 3

The inlet side electrode and the outlet side electrode of a plasma reactor configured in the same manner as the plasma reactor of Example 1 were connected with different pulse power supplies so that current was applied at different frequencies and different voltages, and the measurement was conducted as described above. The measurement results are shown in Table 1.

Comparative Example 1

A pulsed current was applied to a plasma reactor configured in the same manner as the plasma reactor of Example 1 except that the flat electrode constituting the electrode unit was formed by only the inlet side electrodes having an electrode-to-electrode distance of 0.5 mm at a voltage of 4 kV so that the number of pulses was 100 pulse/sec, and the measurement was conducted as described above. The measurement results are shown in Table 1.

Comparative Example 2

A pulsed current was applied to a plasma reactor configured in the same manner as the plasma reactor of Example 1 except that the flat electrode constituting the electrode unit was formed by only of the outlet side electrodes having an electrode-to-electrode distance of 2.5 mm at a voltage of 6 kV so that the number of pulses was 1000 pulse/sec, and the measurement was conducted as described above. The measurement results are shown in Table 1.

Example 4

An exhaust gas purifying device was produced by disposing a catalyst downstream of the plasma reactor of Example 3. The $NO_x$ purification performance of the exhaust gas purifying device was evaluated. As the catalyst, a catalyst powder prepared by impregnating commercially-available gamma-$Al_2O_3$ with 5 mass % of Pt was supported on a cordierite ceramic honeycomb. The honeycomb catalyst was in the shape of a cylinder having a diameter of 105.7 mm and a length of 114.3 mm. The number of cells was 400, and the thickness (rib thickness) of the partition walls partitioning the cells was 4 mil (about 0.1 mm). The plasma generation conditions and the gas conditions were the same as those of Example 3.

As a result, the $NO_x$ concentration of the mixed gas having an NO concentration of 200 ppm was reduced to 120 ppm after the mixed gas had passed the plasma reactor and the catalyst.

Comparative Example 3

An exhaust gas purifying device was produced by disposing a catalyst similar to that used in Example 4 downstream of the plasma reactor of Comparative Example 1. The $NO_x$ purification performance of the exhaust gas purifying device was evaluated. The plasma generation conditions and the gas conditions were the same as those of Comparative Example 1.

As a result, the $NO_x$ concentration of the mixed gas having an NO concentration of 200 ppm was reduced little to 170 ppm after the mixed gas had passed the plasma reactor and the catalyst.

INDUSTRIAL APPLICABILITY

As described above, according to the plasma generating electrode of the present invention, since the unit electrodes include the normal unit electrode and the deficient unit electrode so that the normal space and the deficient space in which the distance between the conductive films differs are formed, intensity of plasma generated in the normal space and the deficient space can be made different. Since the plasma reactor of the present invention includes the plasma generating electrode, when gas containing predetermined components is introduced into the reactor, different kind of a component can be reacted by plasma generated in the normal space and by plasma generated in the deficient space among the predetermined components, so that each component can efficiently be reacted by optimum plasma. Since the exhaust gas purifying device of the present invention includes the above plasma reactor and a catalyst, the exhaust gas purifying device can purify exhaust gas discharged from an automotive engine or the like well.

The invention claimed is:

1. A plasma generating electrode comprising:
   a plurality of unit electrodes hierarchically layered at predetermined intervals, spaces which are open on each end in one direction and are closed on each end in the other direction being formed between the unit electrodes, the other direction being substantially perpendicular to the one direction, the plasma generating electrode being capable of generating plasma in the spaces upon application of voltage between the unit electrodes,
   each of the unit electrodes including a plate-like ceramic body as a dielectric and a conductive film disposed inside the ceramic body, the unit electrodes including a plurality of normal unit electrodes each having a predetermined length in the one direction, the conductive film in each of the normal electrodes extending substantially the entirety of the predetermined length in the one direction, and a plurality of deficient unit electrodes each having a first portion that contains the conductive film and extends only a part of the predetermined length in the one direction, and a second portion extending the remainder of the predetermined length, the second portion not containing the conductive film,
   the spaces including a plurality of normal spaces formed between one of the normal unit electrodes and the first portion of one of the deficient unit electrodes opposite to each other or between the first portions of two of the deficient unit electrodes opposite to each other so that a distance between the conductive films corresponds to a distance between the unit electrodes, and a plurality of deficient spaces formed between the normal unit electrodes opposite to each other with the second portion of one or more of the deficient unit electrodes interposed therebetween so that the distance between the conductive films in the deficient space is greater than the distance between the conductive films in the normal space, and
   the plasma generating electrode being capable of generating different intensities of plasma in the normal space and the deficient space due to the difference in the distance between the conductive films forming the unit electrodes which generate plasma between the normal space and the deficient space.

2. The plasma generating electrode according to claim 1, wherein the dielectric of at least one of the deficient unit electrodes extends the entirety of the predetermined length in the one direction.

3. The plasma generating electrode according to claim 1, wherein the dielectric of at least one of the deficient unit electrodes only extends in the first portion without extending in the second portion of the at least one deficient electrode in the one direction.

4. The plasma generating electrode according to claim 1, wherein the conductive film forming the unit electrodes is constituted of a plurality of conductive film groups set at different potentials upon application of voltage, the conductive film group (first conductive film group) set at a predetermined potential extending to an end of the space in the other direction, and the conductive film group (second conductive film group) set at a potential differing from the potential of the first conductive film group extending to an end of the space in the other direction, the conductive films (first side conductive film and second side conductive film) being provided on a face on the end side to which the first conductive film group extends and a face on the end side to which the second conductive film extends, the first conductive film group being in contact with the first side conductive film to achieve electrical conduction, and the second conductive film group being in contact with the second side conductive film to achieve electrical conduction.

5. A plasma reactor comprising the plasma generating electrode according to claim 1, wherein, when gas containing predetermined components is introduced into the spaces formed between the unit electrodes forming the plasma generating electrode, the plasma reactor is capable of reacting the predetermined components contained in the gas by plasma generated in the spaces.

6. The plasma reactor according to claim 5, wherein, when the gas containing the predetermined components is introduced into the spaces, a component of the predetermined components which is reacted by plasma generated in the normal space differs from a component of the predetermined components which is reacted by plasma generated in the deficient space.

7. An exhaust gas purifying device comprising the plasma reactor according to claim 5 and a catalyst, the plasma reactor and the catalyst being disposed in an exhaust system of an internal combustion engine.

8. The plasma generating electrode according to claim 2, wherein the conductive film forming the unit electrodes is constituted of a plurality of conductive film groups set at different potentials upon application of voltage, the conductive film group (first conductive film group) set at a predetermined potential extending to an end of the space in the other direction, and the conductive film group (second conductive film group) set at a potential differing from the potential of the first conductive film group extending to an end of the space in the other direction, the conductive films (first side conductive film and second side conductive film) being provided on a face on the end side to which the first conductive film group extends and a face on the end side to which the second conductive film extends, the first conductive film group being in contact with the first side conductive film to achieve electrical conduction, and the second conductive film group being in contact with the second side conductive film to achieve electrical conduction.

9. The plasma generating electrode according to claim 2, wherein the conductive film forming the unit electrodes is constituted of a plurality of conductive film groups set at different potentials upon application of voltage, the conductive film group (first conductive film group) set at a predetermined potential extending to an end of the space in the other direction, and the conductive film group (second conductive film group) set at a potential differing from the potential of the first conductive film group extending to an end of the space in the other direction, the conductive films (first side conductive film and second side conductive film) being provided on a face on the end side to which the first conductive film group extends and a face on the end side to which the second conductive film extends, the first conductive film group being in contact with the first side conductive film to achieve electrical conduction, and the second conductive film group being in contact with the second side conductive film to achieve electrical conduction.

10. A plasma reactor comprising the plasma generating electrode according to claim 2, wherein, when gas containing predetermined components is introduced into the spaces formed between the unit electrodes forming the plasma generating electrode, the plasma reactor is capable of reacting the predetermined components contained in the gas by plasma generated in the spaces.

11. A plasma reactor comprising the plasma generating electrode according to claim 3, wherein, when gas containing predetermined components is introduced into the spaces formed between the unit electrodes forming the plasma generating electrode, the plasma reactor is capable of reacting the predetermined components contained in the gas by plasma generated in the spaces.

12. A plasma reactor comprising the plasma generating electrode according to claim 4, wherein, when gas containing predetermined components is introduced into the spaces formed between the unit electrodes forming the plasma generating electrode, the plasma reactor is capable of reacting the predetermined components contained in the gas by plasma generated in the spaces.

13. An exhaust gas purifying device comprising the plasma reactor according to claim 6 and a catalyst, the plasma reactor and the catalyst being disposed in an exhaust system of an internal combustion engine.

* * * * *